United States Patent [19]

Maeda et al.

[11] Patent Number: 5,682,466
[45] Date of Patent: Oct. 28, 1997

[54] INFORMATION PROCESSING APPARATUS FOR OBTAINING OUTPUT DATA FROM PLURAL SETS OF INPUT AND OUTPUT DATA VALUES

[75] Inventors: Akira Maeda, Yokohama; Motohisa Funabashi, Sagamihara; Hiromasa Yamaoka, Hitachi; Nobuyuki Fujikura, Ageo; Mikio Yoda, Ibaraki; Mitsuo Yanagi, Takahagi, all of Japan

[73] Assignee: Hitachi, Ltd., Tokyo, Japan

[21] Appl. No.: 117,765

[22] Filed: Sep. 8, 1993

[30] Foreign Application Priority Data

Sep. 8, 1992 [JP] Japan .................. 4-239258

[51] Int. Cl.$^6$ .................. G06F 17/00
[52] U.S. Cl. .................. 395/50; 395/51; 395/60; 395/61; 395/903
[58] Field of Search .................. 395/11, 50, 51, 395/77, 60, 52, 61, 75, 20-27; 382/155-159, 181

[56] References Cited

U.S. PATENT DOCUMENTS

| | | | |
|---|---|---|---|
| 4,777,585 | 10/1988 | Kokawa et al. | 395/61 |
| 5,043,915 | 8/1991 | Suwa et al. | 395/513 |
| 5,051,932 | 9/1991 | Inoue et al. | 364/550 |
| 5,197,116 | 3/1993 | Katoh et al. | 395/51 |
| 5,239,617 | 8/1993 | Gardner et al. | 395/12 |
| 5,271,091 | 12/1993 | Highland et al. | 395/51 |
| 5,282,265 | 1/1994 | Rohra Suda et al. | 395/51 |
| 5,347,614 | 9/1994 | Yamada et al. | 395/75 |
| 5,359,700 | 10/1994 | Seligson | 395/24 |
| 5,359,701 | 10/1994 | Fukui et al. | 395/62 |

FOREIGN PATENT DOCUMENTS

| | | | |
|---|---|---|---|
| 036150 | 9/1981 | European Pat. Off. | G06K 9/64 |
| 468229 | 1/1992 | European Pat. Off. | G05B 13/00 |
| 2-56602 | 2/1990 | Japan | G05B 13/00 |

OTHER PUBLICATIONS

Chu et al, "Design considerations of a fault tolerant distributed database system by inference technique"; PARBASE-90 International Conference on Databases, Parallell Architecture and their applications, p. 232, 7-9 Mar. 1990.
Tsai, "A knowledge-based system for software design"; IEEE Journal of Selected Areas in Communications, vol. 6 Iss. 5, pp. 828-841, Jun. 1988.
Martinez et al "Automated document distribution using AI based workstations and knowledge based systems"; Proceedings of the Twenty-First Annual Hawaii International Conference on System Sciences, pp. 61-67, 5-8 Jan. 1988.
"Automatic Exposure Metering by Differential Vector Quantization", IBM Technical Disclosure Bulletin, vol. 33, No. 3B, Aug. 1990, pp. 75-76.
W. Brockmann, "Decision Making in Rule-Based Real-Time Systems", At Automatisierungstechnik, vol. 39, No. 9, Sep. 1991, pp. 310-316.
Automobile Technique, vol. 46, No. 5, "Improvement in Shift Timing by Fuzzy Logic", A. Hirako, pp. 100-104.
Hitachi Review, vol. 72, No. 11, Nov., 1990, "Decision Support Expert System for Financial Transactions", H. Shigemi et al, pp. 51-56.

*Primary Examiner*—Tariq R. Hafiz
*Attorney, Agent, or Firm*—Fay, Sharpe, Beall, Fagan, Minnich & McKee

[57] ABSTRACT

An information processing apparatus, which is easy to design and has functions of high speed processing, learning, and so on, includes a plurality of memories for storing sets of previously known input data (called response pattern data) and correct output data corresponding thereto; a comparator for providing input data supplied in actual operations to the plurality of sets and comparing the input data with the response pattern data in each set; an evaluation unit for evaluating the distance (degree of similarity) between the input data and the response pattern data; and a generator for generating final outputs by composing the evaluation result for each set and the output data in that set, for example, using a method which calculates weighted average values based on the evaluated distances.

19 Claims, 12 Drawing Sheets

| MEMORY CELL NUMBER 1101 | USE FLAG 1102 | EXCEPTION FLAG 1103 | RESPONSE PATTERN DATA 1104 | OUTPUT DATA 1105 | REFERENCED TIMES 1106 |
|---|---|---|---|---|---|
| 1001 | 1 | 0 | (42,35,*,*,20) | (367,29) | 21 |
| 1002 | 1 | 0 | (62,15,48,120,*) | (250,*) | 128 |
| 1003 | 0 | 0 | | | 0 |
| 1004 | 1 | 0 | (115,20,*,28,36) | (192,53) | 26 |
| 1005 | 0 | 1 | | | 0 |
| | | | | | 0 |
| 1064 | 1 | 1 | (160,64,90,180,72) | (0,0) | 1 |

F I G. 12
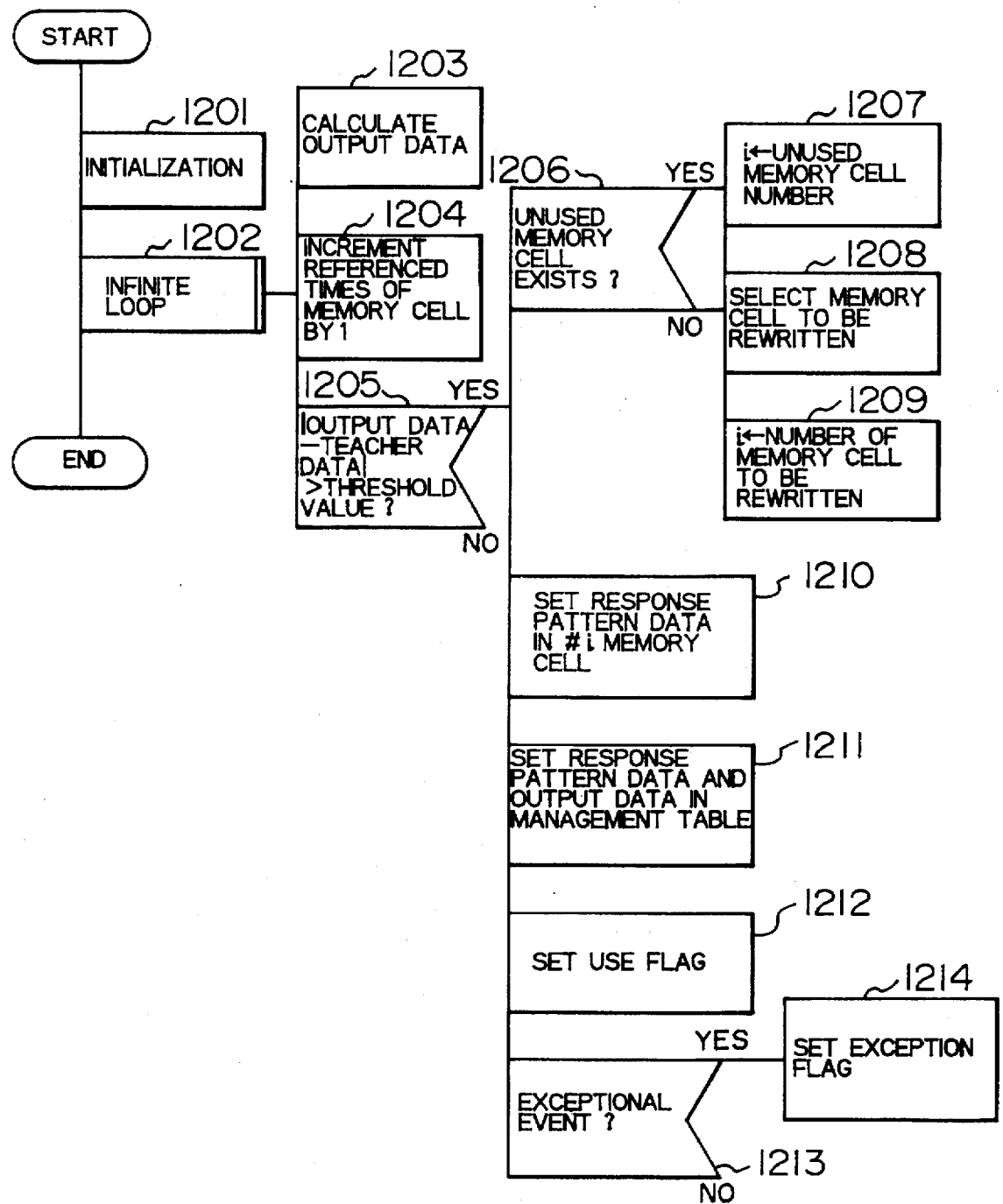

F I G. 13
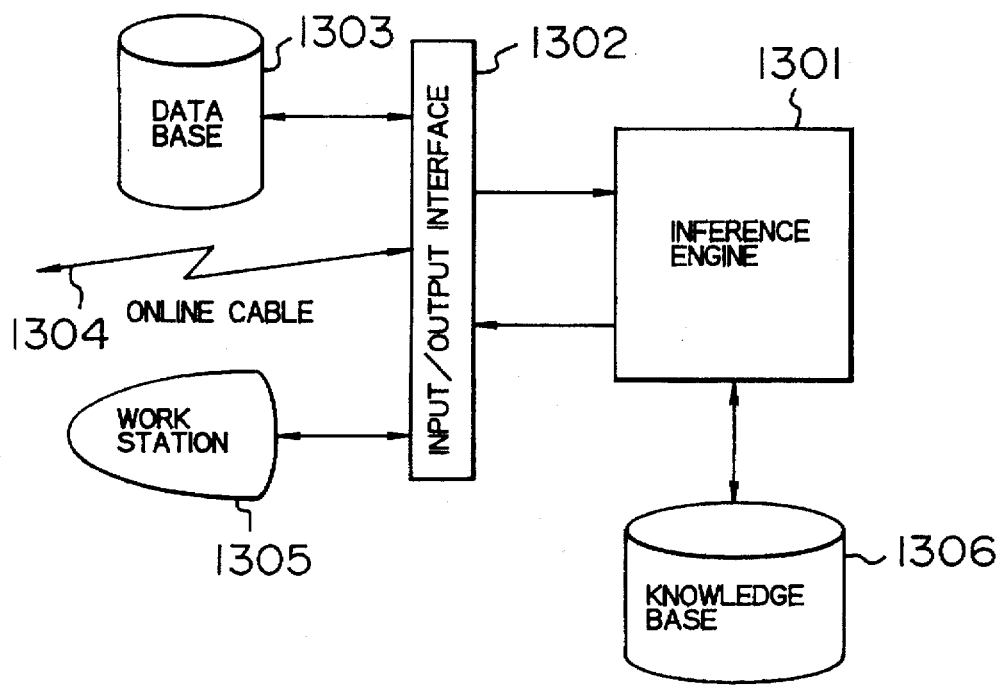
F I G. 14
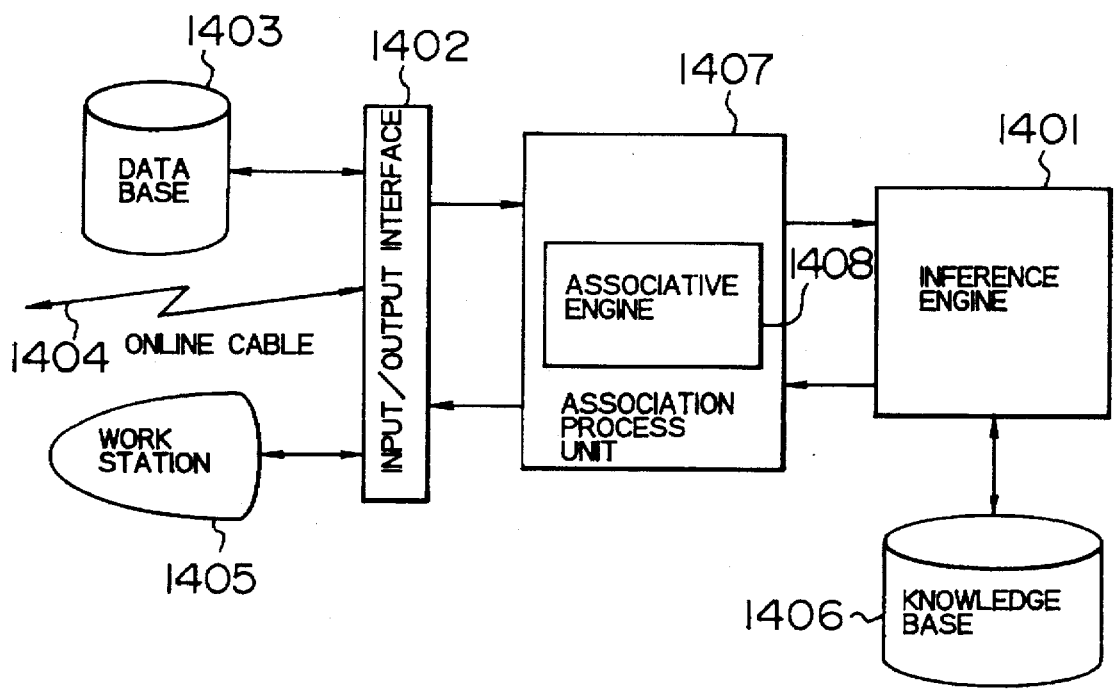

FIG. 16

```
No.309 CHART:MOVING AVERAVE LINE
   if BULL-ORDER( 0)
      BULL-ORDER(-1)
      MAa( 0) ≳ MAa(-1) FUZZY(0.03)
      MAb( 0) ≳ MAb(-1) FUZZY(0.03)
      MAc( 0) ≳ MAc(-1) FUZZY(0.03)
      MAd( 0) ≳ MAd(-1) FUZZY(0.03)
 then PREDICTION:  0.00—0.10(0.5)
      MESSAGE : BULL-TREND
```

REMARKS : MAa, MAb, MAc, MAd, : A MOVING AVERAGE LINE OF FOUR LINES WITH DIFFERENT AVERAGE PERIODS. THE AVERAGE PERIOD OF MAa IS THE SHORTEST.

MAa( 0), MAa(-1) : 0 INDICATES A REFERENCE TIME, AND -1 ONE TIME BEFORE.

≳, FUZZY(0.03) : A MEMBERSHIP FUNCTION OF A FUZZY SET IS DETERMINED BY AN OPERATOR (≳) AND A PARAMETER (0.03).

BULL-ORDER : AN EXAMPLE OF A PATTERN NAME WHICH REFERS TO AN EVENT DEFINED BY ANOTHER RULE.

INFORMATION PROCESSING APPARATUS FOR OBTAINING OUTPUT DATA FROM PLURAL SETS OF INPUT AND OUTPUT DATA VALUES

BACKGROUND OF THE INVENTION

The present invention relates to an information processing apparatus such as a controller and a pattern recognition apparatus for determining output data from input data, and more particularly to an information processing apparatus which stores plural sets of input/output data and determines outputs based on the sets to facilitate designing as well as realize high speed processing and advanced functions such as learning.

In conventional control apparatuses, methods of determining outputs from inputs may be roughly classified into the following three categories:

(1). A method which uses some mathematical models (prior art 1);

(2). A method which uses so-called knowledge processing techniques such as fuzzy reasoning and neural networks (prior art 2);

An example of engine control is described, for example, in publication entitled "Improvement in Shift Timing by Fuzzy Logic" by Atsushi Hirako et al, in Automobile Technique, Vol. 46, No. 5, pp. 100–104.

(3) A method which uses lookup tables (prior art 3).

Many prior art examples of pattern recognition apparatuses are also known which may be roughly classified into the following two categories:

(4) A method which uses characteristic values of objects to design a recognition algorithm for each object (prior art 4).

(5) A method which uses a learning function such as neural networks (prior art 5).

A prior art technique closest to the present invention may be that described in JP-A-2-56602, entitled "Fuzzy Reasoning Apparatus" (prior art 6). This is a technique similar to the prior art 3 which performs controls using lookup tables.

The concept of this prior art 6 will be explained below. When an input/output relation is to be represented using fuzzy reasoning in applications to control, recognition and so on, if dedicated hardware is used in order to speed up operations such as calculations of membership function values and composition of fuzzy rules, which are executed every time the reasoning is performed, the circuit scale of the hardware will be extremely extended when the number of input data items and the number of fuzzy rules are increased. To solve this problem, this known example has all possible input/output relations previously stored in a memory, since if a value of input data is determined, the value of output data is uniformly determined also in fuzzy reasoning. For example, when there are two input data items which are each represented by an 8-bit integer value, the values of the input data are regarded as an address having 16 bits, and output values derived by the fuzzy reasoning corresponding to respective input values given as addresses are stored in a memory having a capacity of 65,536 ($=2^{16}$) words. In this manner, all operations required for the fuzzy reasoning can be executed by replacing the operations with the addressing of memory.

When the number of input data items is further increased, the prior art 6 describes employment of a method which utilizes an auxiliary storage unit to store the additional input/output relations for increased input data items by using, so to speak, a virtual storing method; and a method which connects the above-stated configuration in multiple layers. For example, if the number of input data items is four, this method connects configurations of two-inputs/one-output in two stages.

In any case, the configuration of this prior art 6 is equivalent to a system which implements the method using lookup tables with hardware, from a view-point that an input data value is converted to an address to derive an output which has previously been stored in that address in a memory.

SUMMARY OF THE INVENTION

The prior art 1 for controllers is supported by many theories such as traditional control theory and advanced control theory, and has been widely put to practical use. However, the prior art 1 implies a problem that these theories cannot be applied to an object which is so complicated that no mathematical model can be composed. Also, even if mathematical models can be theoretically composed, the actual composition of hardware requires theoretical knowledge so that a designer highly skilled in the art is essential for designing a complicated control system. Further, if the characteristics of a control object vary in time, a model must be built which can follow such variations which, however, is more difficult to be realized. In fact, such time-varying models have not been put to practical use except for exceptional cases.

The prior art 2, which is intended to solve part of the above-stated problems, can build a control system utilizing human experts' knowledge or using a learning function of the neural networks even if the composition of mathematical models is extremely difficult. Nevertheless, these techniques, although not so much mathematical knowledge is required therefor, largely depend on designers' know-how with respect to how to acquire human experts' knowledge and represent it in a computer processible form; how to collect data for learning in the case of neural networks; how to determine the structure of neural networks; how to select parameters necessary to execute the learning; and so on. Consequently, the number of designers who are capable of designing control systems using these techniques is quite limited, and moreover the designers themselves require much time to design such complicated control systems, thereby incurring an increased cost for designing control systems.

While the prior art 3 is characterized in that high speed processing is enabled with a relatively simple configuration, a majority of methods belonging to the prior art 3 are supposed to treat two or at most three input variables. If the number of input variables is increased more than three, an immense memory capacity is required to store lookup tables. Particularly, with a built-in type controller, the provision of a memory having an extremely large capacity is very difficult to realize. For example, if five input variables are to be treated and their values are respectively represented in eight bits, the whole of the input data is represented by a total of 40 bits. Thus, for storing these data items in a lookup table, a memory requires a capacity of $2^{40}$, i.e. one tera words. For a built-in type controller, this is almost impossible to realize because of the high cost. Since the number of input variables is increased as a system becomes more complicated, it is apparent that the simple lookup table-based system is applicable only to a limited range.

The prior art 4 relative to pattern recognition apparatuses implies a similar drawback to the controller discussed above. Specifically, determination of characteristic values required for recognition, how to design a recognition algorithm, and so on basically require a high level of know-how, so that these problems can be treated only by designers highly skilled in the art. Also, even if such a recognition algorithm could be designed for a certain problem, completely different approaches would be necessary, for example, for speech recognition and character recognition. Thus, a different recognition algorithm must be designed for each individual object from the beginning, thereby presenting a remarkable problem of an increasingly large cost of system development.

In contrast with the prior arts 1–4, the prior art 5, i.e., a method using a learning function, can theoretically avoid the problem of large cost of development and build a pattern recognition apparatus, by preparing a number of sets (referred to as "teacher data") of an input pattern and an output corresponding thereto (recognition result) and then learning the relation between a different input pattern and an output corresponding thereto according to a previously defined learning procedure. However, when a pattern recognition apparatus is to be actually built, the prior art 5 also requires know-how to prepare teacher data, and to determine a network structure and set a variety of parameters (a learning coefficient, a momentum coefficient, and so on) upon executing the learning in the case of neural networks. The fact is that the preparation of teacher data does not always permit a pattern recognition apparatus to be fully realized.

The prior art 6 essentially implements the prior art 3 with hardware, so that the problem implied in the prior art 3 cannot be avoided with respect to the memory capacity. Even if an auxiliary storage unit is additionally employed, the prior art 6 cannot solve a similar problem which becomes more serious as the number of input variables is increased.

A method which reduces the capacity of memory by a multi-stage connection, as shown in JP-A-2-56602, apparently causes restrictions on expressible input/output relations. Specifically, supposing that four input variables are divided into two sets each including two variables, and input/output relations are represented by referencing two-stage tables, if all the input variables are represented in eight bits, three memories having a 64 k-word capacity are sufficient to represent all the input/output relations. However, since the input variables have an information amount of 32 bits (4×8 bits), this method can merely represent an approximation of the input/output relations. This will be understood from the fact that part of the information provided by the input variables is lost at the time 16-bit input data of each set is converted to 8-bit data at the first stage of the lookup table reference in the method shown in JP-A-256602.

It is an object of the present invention to provide an information processing apparatus such as a controller and a pattern recognition apparatus, particularly for determining output data from input data, which facilitates the apparatus design and realizes high speed processing and advanced functions such as a learning function by storing a plurality of input/output sets and determining outputs based on these sets.

To solve the above-stated problems, the present invention has previously stored a plurality of sets of previously known input data (input data from sensors in the case of a controller, and characteristic value data of a pattern to be recognized in the case of a recognition apparatus) and correct output data corresponding to the input data (a manipulating amount as a control output in the case of a controller, and recognition results of a pattern in the case of a recognition apparatus). The previously provided input data is hereinafter called "response pattern data" for distinguishing it from actually inputted data. The response pattern data herein need not have all items of inputted data but may include partial information necessary to determine certain particular correct output data. For example, assume in pattern recognition that there are n characteristic values. A character may occasionally be determined if m (n>m) of the n characteristic values take particular values irrespective of the remaining (n−m) characteristic values. In this case, the response pattern data need not have all of the n characteristic values but may only have partial information, i.e., sets including m characteristic values.

Next, data inputted in an actual operation is provided to each of the plurality of sets. Then, the input data is compared with the response pattern in each set to evaluate the distance (degree of similarity) between the input data and the response pattern.

Then, a final output is generated by composing the evaluation result for each set and output data in that set, for example, by a method which calculates weighted average values based on the evaluated distances.

BRIEF DESCRIPTION OF THE DRAWINGS

FIG. 12 shows a processing flowchart of the learning type controller;

FIG. 13 is a block diagram showing the configuration of a knowledge processing system;

FIG. 14 is a block diagram showing the configuration of a third embodiment of the present invention;

FIG. 16 shows an example of a rule for a technical analysis support system; and

DESCRIPTION OF THE PREFERRED EMBODIMENTS

First, the principle of the present invention will be explained with reference to FIGS. 1 and 2.

Figure 1:
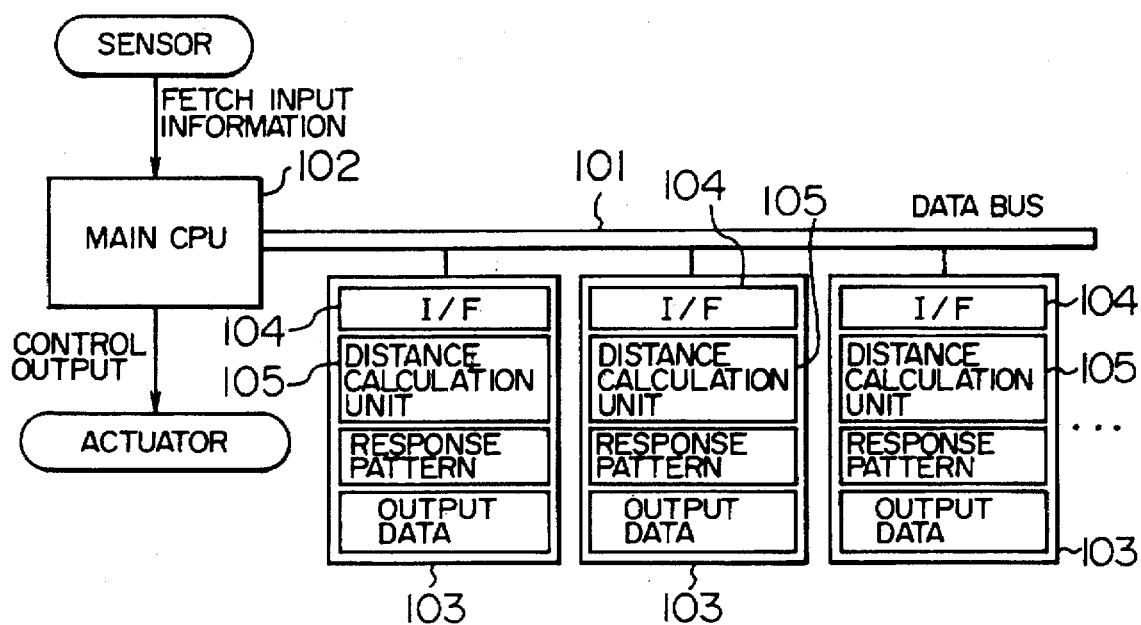
FIG. 1 is a block diagram showing the hardware configuration of a first embodiment of the invention.
Figure 2:
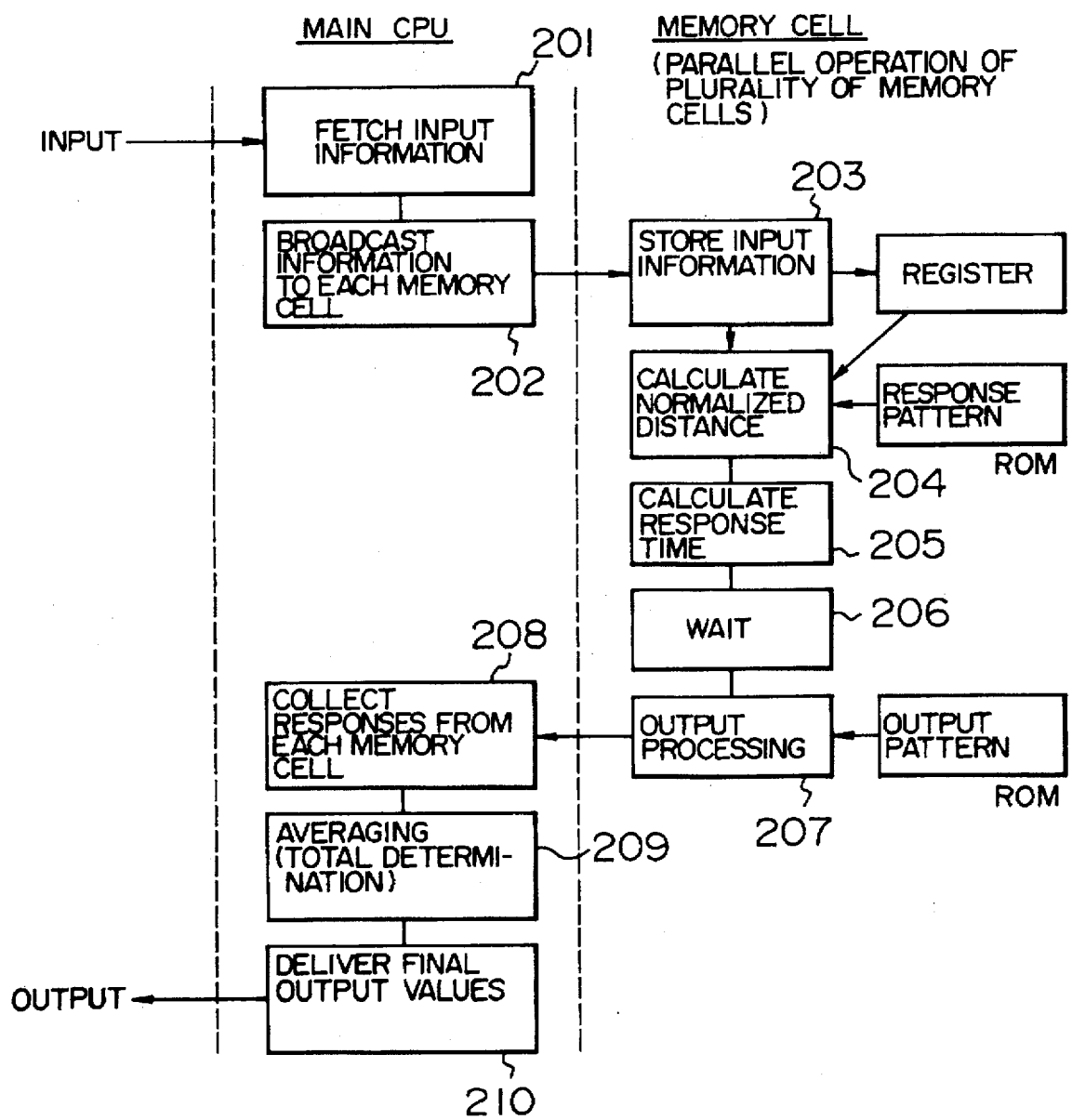
FIG. 2 shows a processing flowchart of the embodiment shown in FIG. 1.

FIG. 1 is a block diagram showing the configuration of the present invention when implemented by hardware. The whole configuration comprises a data bus 101; a main CPU connected to the data bus 101 for controlling all components arranged in the configuration; and a plurality of memory cells 103. Stored in each of the plurality of memory cells 103 is a set of a response pattern data and output data. Also, each of the memory cells 103 is provided with an interface unit 104 for interfacing with the data bus 101 and a distance calculation unit 105 for calculating the distance between input data and response pattern data.

The main CPU 102 first broadcasts input data to all of the memory cells 103 through the data bus 101. Each of the memory cells 103 receives the input data broadcasted from the main CPU 102 and calculates the distance between the received input data and response pattern data previously stored therein. Each of the memory cells 103 delivers output data based on the calculated distance through the interface unit 104 to the data bus 101. Then, the main CPU 102 collects output data from the respective memory cells 103 and composes a final output.

Next, a processing procedure executed by the configuration shown in FIG. 1 will be explained with reference to a flowchart of FIG. 2.

First, at step 201, the main CPU 102 fetches input information which is broadcast to the respective memory cells 103 at step 202.

In each of the memory cells 103, the data broadcast at step 203 is temporarily stored in a register provided in each memory cell 103. Then, the distance between the input data and response pattern data is calculated (by the distance calculation unit 105 shown in FIG. 1) at step 204.

Next, at step 205, a response time of each memory cell 103 is calculated in accordance with the calculated distance, and the processing is delayed by the calculated response time at step 206. Assume here that the response time is shorter as the distance is shorter. After the delay or wait at step 206, output data is delivered onto the data bus 101 at step 207.

The main CPU 102 waits for responses from the respective memory cells 103 at step 208, and sequentially reads them as they arrive. In other words, the main CPU 102 sequentially reads output data corresponding to response pattern data that is closer to input data. At step 209, the output data read at step 208 is averaged in accordance with the distances thereof, and a final output value is derived at step 210.

In the case of either a controller or a pattern recognition apparatus, a problem is considered as to how to design a means for determining outputs from inputs. The present invention copes with this problem by storing a plurality of sets of input data (response pattern data) and output data, composed as described above, for determining an actual output for actual input data from output data corresponding to the response pattern data having distances close to the actual input data.

In this manner, when a complicated input/output relationship is represented by sets of response pattern data and output data, complicated theories and designing know-how are unnecessary, thereby making it possible to solve the problem implied in the prior art methods 1, 2, 4 and 5, that the design of the apparatus is very difficult and causes an increase in developing cost.

Further, in comparison with a lookup table system which stores appropriate output data for all possible combinations of input values, since the present invention determines a final output based on the distance between response pattern data and input data, fewer sets of response pattern data and output data need to be stored for this determination, thereby greatly saving the capacity of the storage unit. This effect will be further enhanced if partial information of input data is stored in the storage unit as response patterns.

Next, specific embodiments of the present invention will be explained with reference to FIGS. 3–16.

Figure 3:
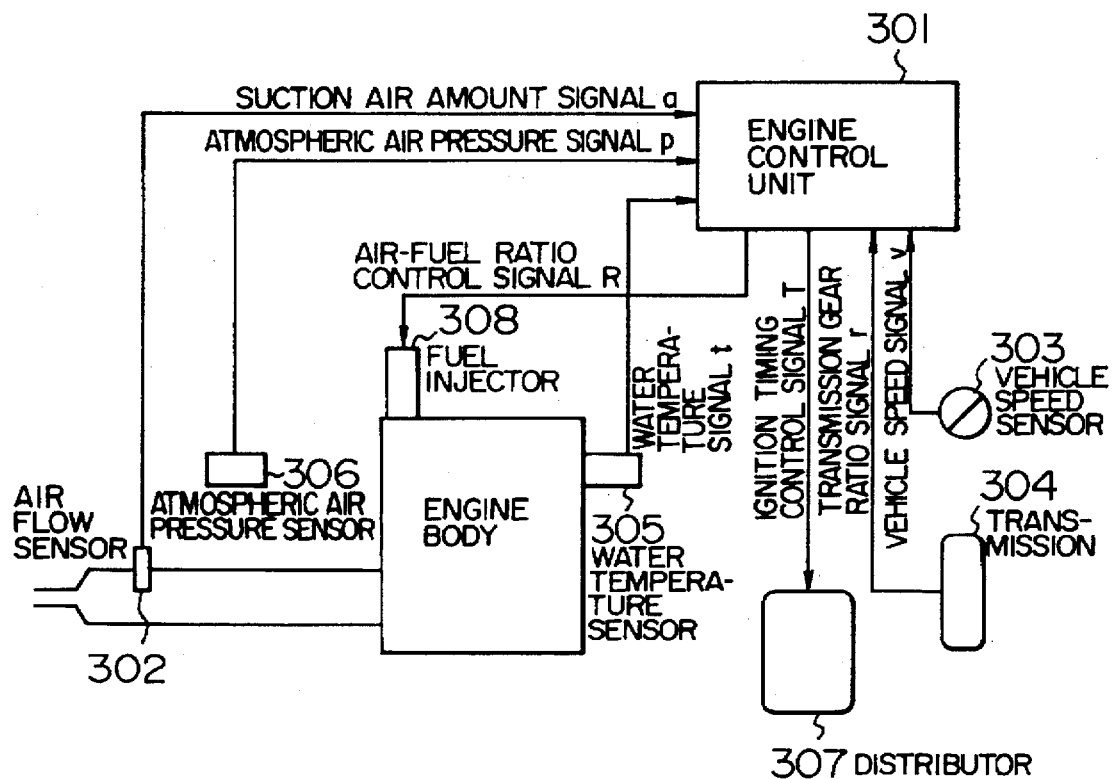
FIG. 3 is a block diagram showing the whole configuration of an engine control system.

FIG. 3 illustrates the whole configuration of an automobile engine control system which is a first embodiment of the present invention. An engine control unit 301 receives, as inputs, a suction air amount signal a from an air flow sensor 302; a vehicle speed signal v from a vehicle speed sensor 303; a transmission gear ratio signal r from a transmission 304; a water temperature signal t from a water temperature sensor 305; and an atmospheric air pressure signal p from an atmospheric air pressure sensor 306, and outputs an ignition timing control signal T to a distributor 307 and an air-fuel ratio control signal R to a fuel injector 308 in order to maintain amounts of torque and exhaust gas produced by an engine at appropriate values.

Figure 4:
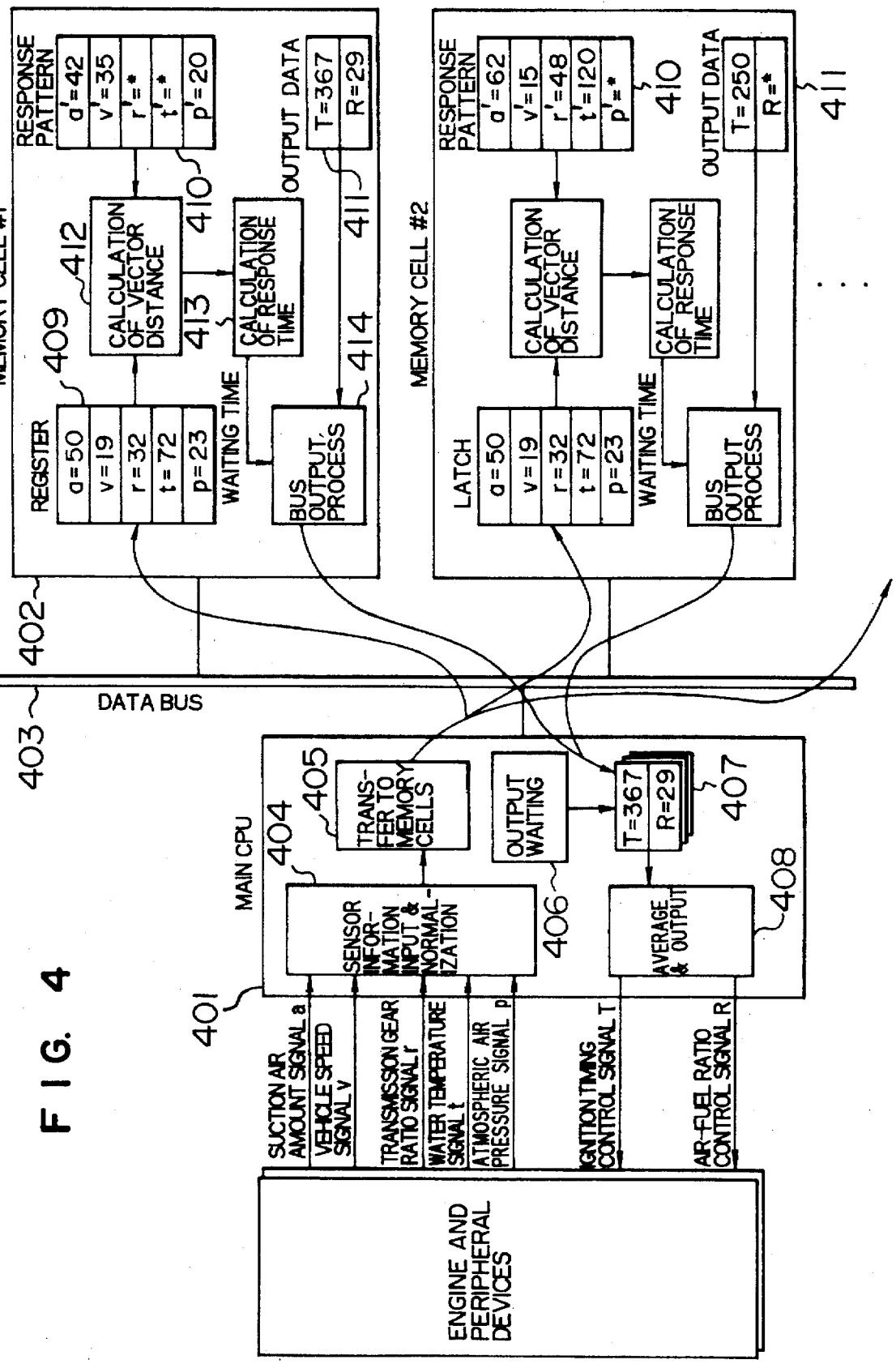
FIG. 4 is a block diagram showing the configuration of an engine control unit.

FIG. 4 illustrates in block form the internal configuration of the engine control unit 301 shown in FIG. 3. The engine control unit 301 is mainly composed of a main CPU 401 for controlling operations of the whole unit and performing input/output interface with the outside; a plurality of memory cells 402 (for example, 1,024); and a data bus 403 for connecting them. As to an address bus and a control bus, both illustration and explanation thereof will be omitted.

The main CPU 401 first reads the suction air amount signal a, vehicle speed signal v, transmission gear ratio signal r, water temperature signal t, and atmospheric air pressure signal p, which constitute inputs to the engine control unit 301, normalizes these signals if necessary, and temporarily stores them in a register arranged in the main CPU 401, as represented by a sensor information input process 404. For illustration, assume now that the signals are set to a=50, v=19, r=32, t=72, and p=23, respectively.

Next, the data stored in the register 405 is transferred to each of the plurality of memory cells 402, as represented by a data transfer process 405. This transfer is performed according to a broadcast method. Thereafter, the main CPU 401 waits for outputs from the memory cells, as represented by an output waiting process 406. At the time outputs are returned from the memory cells 402, the outputs from the memory cells are stored in an internal register 407 of the main CPU 401 in the output waiting process 406. This process is repeated until either of the following conditions is satisfied: outputs are derived from a predetermined number of memory cells or the main CPU 401 waits for a predetermined time period.

Then, in an averaging and output process 408, outputs from the memory cells 402, which have been stored in the internal register 407, are averaged to determine final control outputs. The resultant outputs are supplied to the distributor 307 and the fuel injector 308. The averaging is preferably performed such that the final outputs are derived, for example, from three memory cells, wherein the outputs from the memory cells are represented by Ti and Ri (i=1, 2, 3), and resultant averaged values Tav and Rav are expressed by Tav=ΣTi/3 and Rav=ΣRi/3, respectively, where Σ represents a sum of Ti or Ri with i=1, 2, 3.

The operations inside the memory cells will be next explained. The operations in the respective memory cells are common and executed in parallel. Here, the operation in a memory cell #1 will be explained as an example.

Data transferred by the main CPU 401 by the data transfer process 405 is stored in the register 409 in the memory cell. The memory cell has stored in a register 410 response pattern data with which each memory cell should respond, and in a register 411 output data of the memory cell corresponding to the response pattern. The response pattern data basically includes amounts which represent states of objects in an engine control environment, while the output data corresponds to a control operation to be performed for individual states of the engine represented by the response pattern data. A variety of methods may be conceived to determine a plurality of sets of the response pattern data; and output data: for example, a method which employs a learning function to automatically determine the sets, as will be later explained in a second embodiment; a method which derives the sets converted from input/output relations described by another means such as fuzzy logic; and so on.

Employed herein is a method which determines the sets simply by using a clustering method. More specifically, a seven-dimensional vector is supposed which is a combination of five-dimensional response pattern data and two-dimensional output data, and a multiplicity of sets of the seven-dimensional vector can be utilized for simulations at a design stage and so on. In this event, since the number of the seven-dimensional vectors is generally immense, even if these could be stored as they are in memory cells, such storage is extremely inefficient. Therefore, the seven-dimensional vectors are, for example, classified into 1,024 clusters by a proper clustering method, and representative values of the respective clusters are stored in the memory cells so that 1,024 sets of response pattern data—output data can be determined.

At the time data has been stored in the register 409, the distance between data in the register 409 and data in the register 410 is calculated in a vector form, as represented by a vector distance calculation process 412. In the example of FIG. 4, the data consisting of the suction air amount signal a, vehicle speed signal v, transmission gear ratio signal r, water temperature signal t and atmospheric air pressure signal p, stored in the register 409, are regarded as a five-dimensional vector (a, v, r, t, p), while a response pattern stored in the register 410 is likewise regarded as a five-dimensional vector (a', v', r', t',p'), and the distance D between the two vectors is expressed by the following equation 1:

$$D=|a-a'|+|v-v'|+|r-r'|+|t-t'|+|p-p'| \quad \text{(equation 1)}$$

Note however that when a special value indicated by "*" exists in the data stored in the register 410, this value is regarded as having a distance equal to zero for any corresponding input value, that is, this value is regarded to be a "don't care" value, so that such items are omitted from the distance calculation of the equation 1. Specifically, in the example of the memory cell #1 shown in FIG. 4, since r'=* and t'=* are indicated, the distance D will be actually calculated by the following equation 2:

$$D=|a-a'|+|v-v'|+|p-p'| \quad \text{(equation 2)}$$

In the example of the memory cell #1 shown in FIG. 4, where corresponding data in the register 409 are to be copied for data having the items set to the symbol "*" in the response pattern, substitutions of r'=r (=32) and t'=t (=72) may of course be executed prior to the vector calculation process 412. The symbol "*" may be represented by a value which would never appear as a specific input value, for example, −1 (FFFF when denoted in 16-bit signed hexadecimal representation of integers).

Figure 5:
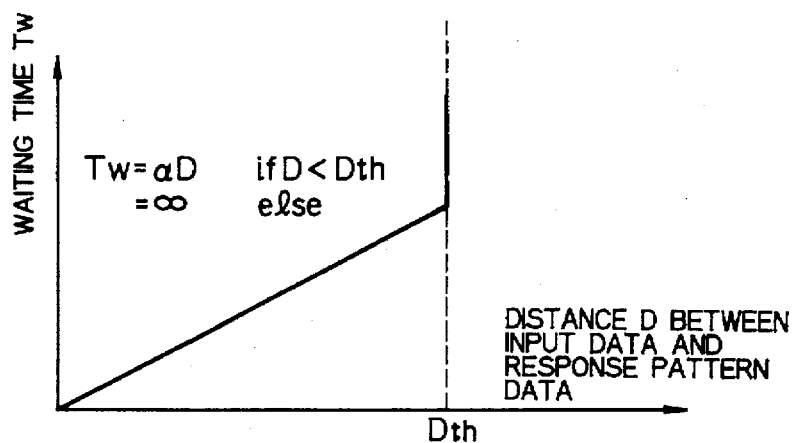
FIG. 5 is a graph representing a response time calculating function.

With the distance D calculated by the equation 1 or 2, a response time calculation process 413 calculates a waiting time Tw representing a time period which will elapse before each memory cell returns a response to the main CPU 401. This waiting time Tw is a monotonously increasing function of the distance D. FIG. 5 shows an example of the waiting time Tw. The example of FIG. 5 illustrates that the waiting time Tw linearly increases up to a threshold value Dth, and when the distance D exceeds the threshold value Dth, the waiting time becomes infinite, that is, no response is returned.

The waiting time Tw calculated in the response time calculation process 413 is delivered to a bus output process 414, where output data is sent onto the data bus 403 after the lapse of the waiting time Tw. In the example of the memory cell #1 shown in FIG. 4, the ignition timing control signal T=367 is outputted to the distributer 307, and the air-fuel ratio control signal R=29 is outputted to the injector 308.

The operations as described above are simultaneously executed in the plurality of memory cells. Data which indicate different values from one memory cell to another are only the response pattern data and the output data stored in the register 410 and 411, respectively.

With the configuration as described above, if response pattern data and output data corresponding thereto have been stored in a plurality of memory cells, the memory cell having the closest response pattern to arbitrary input data from sensors will provide output data with the shortest waiting time. Viewed from the main CPU 401, by reading output data from the memory cells in accordance with the responded time order without sequentially inquiring of all the memory cells, output data can be provided corresponding to the order in which the distance between input data and response pattern data is closer. Therefore, the present invention is advantageous in that even if the number of memory cells is increased, a time required to output data will hardly change so that high speed control can be maintained irrespective of the number of memory cells. Incidentally, while the distance between input data and response pattern data is defined as the sum of an absolute value of the difference therebetween in the equation 1, this equation may of course be replaced with an ordinary distance defining equation which employs the sum of a square of the distance or the like.

In the foregoing example, the don't care value represented by "*" is permitted to the response pattern data. This don't care value is advantageous in that, upon storing sets of response pattern data—output data into the memory cells, the designation of values relative to unnecessary input data can be omitted when only partial sensor input information actually determines output data. Thus, the present invention is characterized in that a certain input/output relation can be expressed with a smaller number of sets of response pattern data—output data, i.e., with a smaller number of memory cells.

In addition, the don't care value may be permitted to the output data. In this case, treatment of the don't care value is determined by the main CPU 401. Specifically, in the foregoing averaging process, data signals having the don't care value may be excluded from the average value calculation. If all of Ti or Ri present the don't care value, predetermined default values may be outputted, or output values derived in the preceding control cycle may be stored such that the same values are again outputted.

While in the foregoing configuration, each set of response pattern data—output data is made to correspond to a distance calculation hardware unit, a plurality of sets of response pattern data—output data may be made to correspond to a single distance calculation hardware unit such that the single distance calculation hardware unit sequentially calculates the distances for the plurality of sets, thus reducing the amount of necessary hardware.

Figure 6:
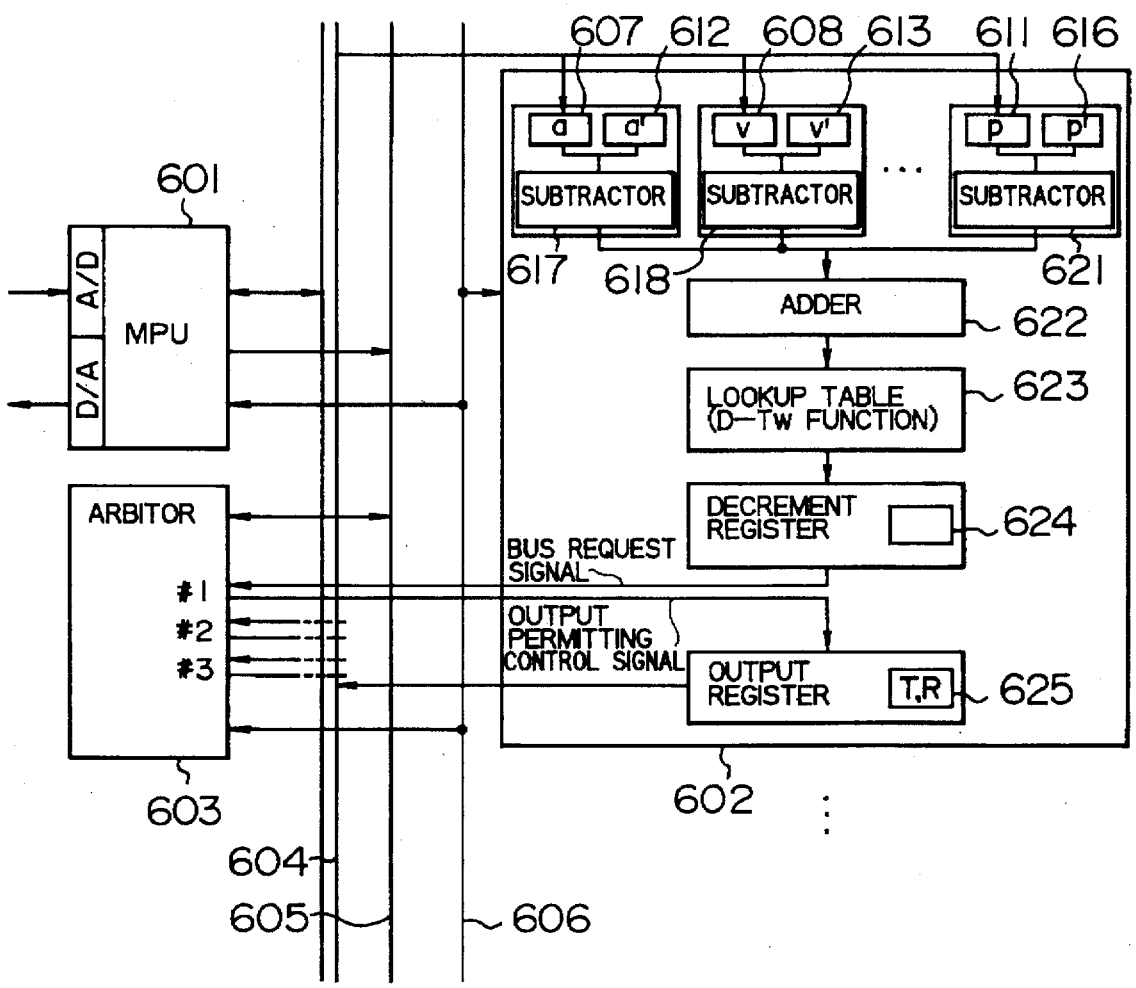
FIG. 6 is a block diagram showing the hardware configuration of the engine control unit.

FIG. 6 illustrates the configuration of the engine control unit shown in FIG. 4 when it is implemented by hardware.

Reference numeral 601 designates a microprocessor which implements the main CPU 401 in FIG. 4. The sensor information input process 404, data transfer to memory cells represented by the process 405, memory cell output waiting process 406, and output process 408 in FIG. 4 are executed in accordance with a program which has been previously stored in a program memory provided in the microprocessor 601.

Reference numeral 602 designates memory cells corresponding to the memory cells 402 in FIG. 4, and 603 an arbitor for controlling the plurality of memory cells 602 so as to prevent a conflict from occurring when the plurality of memory cells 602 are going to simultaneously deliver data. The microprocessor 601, memory cells 602, and arbitor 603 are respectively connected to a data bus 604 (indicated by a double line), a control signal line 605 and a clock signal line 606, so that each constituent element operates synchronously in accordance with a clock signal on the clock signal line 606. It should be noted that a clock generator circuit for supplying the clock signal is omitted in FIG. 6.

The internal configuration of the memory cells 602 will be explained next. The register 409 in FIG. 4 corresponds to registers 607–611 in FIG. 6. The registers 607–611 are loaded with the sensor information a, v, r, t, p, respectively, which have been broadcast from the microprocessor 601 and read from the data bus 604 in accordance with a control signal on the control signal line 605.

Response pattern data a', v', r', t', p' have previously been stored in registers 612–616.

Subtractors 617–621 each execute a subtraction between sensor information and response pattern data with respect to a corresponding information item, and deliver the results to an adder 622. The adder 622 receives the results from the five subtractors as inputs and calculates the total sum D of their absolute values.

The function shown in FIG. 5 has previously been stored in a lookup table 623 as a table, such that the output D of the adder 622 is converted to a waiting time Tw by this lookup table 623. The output Tw of the lookup table 623 is stored in a decrement register 624 and is decremented by one per unit time.

When the contents of the decrement register 624 indicate zero, a control signal is transmitted to the arbitor 603. At the time an output permitting control signal is returned from the arbitor 603, output data previously stored in an output data register 625 is delivered onto the data bus 604.

Figure 7:
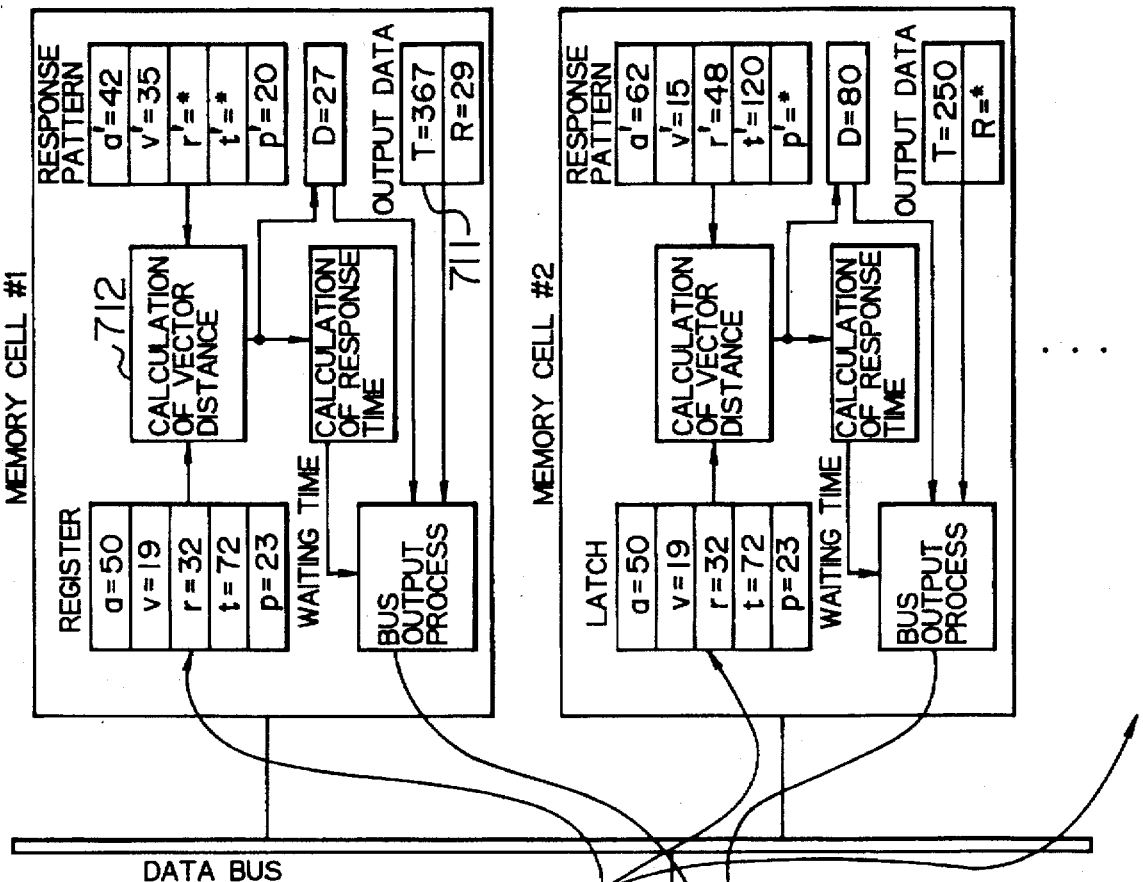
FIG. 7 is a block diagram showing the configuration of an alternative engine control unit.

FIG. 7 shows another method of implementing the engine control unit of FIG. 4. The configuration of FIG. 7 differs from that of FIG. 4 in that, upon outputting data from each memory cell, the distance D between input data and a response pattern calculated in a vector distance calculation process 712 is delivered in addition to an output from a register 711.

In this event, the output data and distance data stored during an output waiting process 706 executed by the main CPU are used to calculate final outputs Tav, Rav in an averaging and output process 708 by the following relational equations:

$$Tav=\Sigma(Ti/Di)/\Sigma(1/Di)$$

$$Rav=\Sigma(Ri/Di)/\Sigma(1/Di)$$

These equations each correspond to a weighted average which is taken by use of a larger weight (specifically, in accordance with an inverse of the distance) for an output from a memory cell having response pattern data with a shorter distance, i.e., a higher degree of similarity relative to input data. (It should be noted however that if an ith memory cell exists which outputs a distance Di equal to zero, Ri and Ti are replaced with Ray and Tav, respectively (Rav=Ri, Tav=Ti).)

By thus calculating final outputs using weighted averages in accordance with the distance or degree of similarity, the accuracy of the averaging process can be improved, thereby making it possible to represent an input/output relation in a similar grade of accuracy with a smaller number of memory cells.

As described above, according to the first embodiment of the present invention, a plurality of sets of response pattern data and output data are stored, and a set having response pattern data close to inputted data can be derived at a high speed by a hardware configuration, so that a high speed control can be always accomplished even if a multiplicity of sets of response pattern data and output data are required.

Also, since final outputs are determined not only from the closest response pattern but also as weighted average values of output data corresponding to a plurality of response patterns, more accurate outputs can be provided. Further, when the response pattern data is made up of partial information of input data items, the number of sets of response pattern data—output data can be reduced without degrading the output accuracy.

While the hardware configuration illustrated in FIG. 6 shows that the memory cells are all connected to a single data bus, similar effects can also be produced when a hierarchical bus architecture or a ring bus architecture is employed as is well known in ordinary network connections.

Further, although the foregoing embodiment executes the calculation of the degree of similarity (distance) for data items stored in each memory cell according to one and the same procedure, the definition of the degree of similarity may be changed for each memory cell if employing, for example, a method which stores a different calculation algorithm for each memory cell in ROM or RAM (program memory) as a micro-program. Additionally, the contents of the table representing the relation between the distance and the waiting time may also be changed for each memory cell. In this case, a table may be set so as to allow memory cells having important sets of response pattern data—output data to preferentially respond, thereby providing more accurate outputs.

Figure 8:
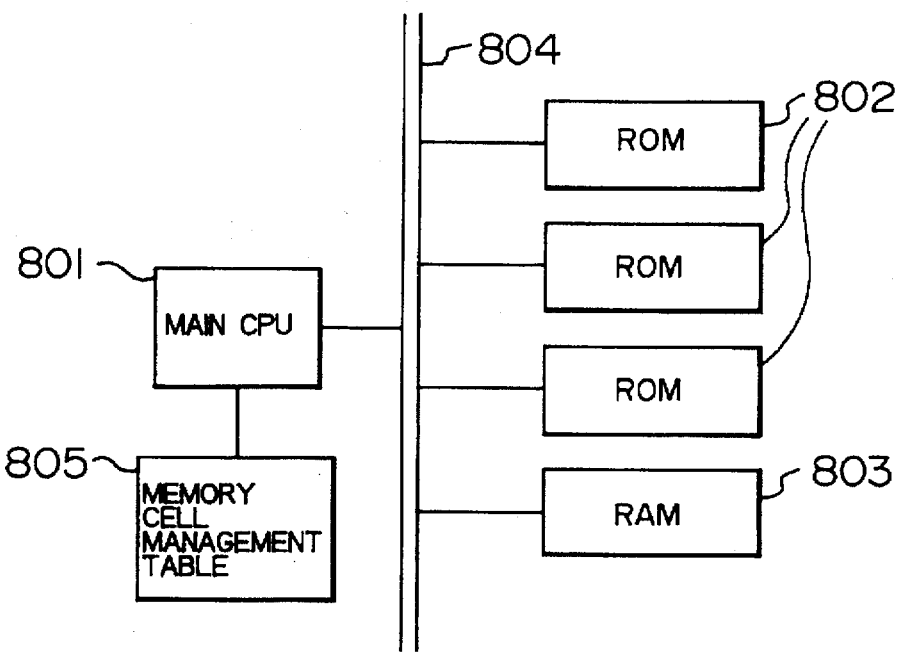
FIG. 8 is a block diagram showing the configuration of a learning type controller according to a second embodiment of the present invention.

FIG. 8 illustrates in block form the configuration of a learning-type controller according to a second embodiment of the present invention.

The learning-type controller according to the second embodiment comprises a main CPU 801; one or a plurality of ROM-type memory cell chips 802 and RAM-type memory cell chips 803; and an external bus 804 interconnecting these constituents.

The main CPU 801 executes input/output processing associated with the controller, management of execution mode/learning mode (later described), data transfer processing to the memory cell chips, and so on. Thus, the main CPU 801 has substantially the same roles as the main CPU 401 employed in the first embodiment in FIG. 4.

The memory cell chips 802 (ROM type) and 803 (RAM type) respectively implement a plurality of integrated memory cells 402 (for example, every 16) shown in FIG. 4 as LSI chips. It should be noted however that, unlike the structure of the memory cell 402 in FIG. 4, the output data register 411 is assumed to have a memory cell number, not output data, stored therein. The main CPU 801 converts this memory cell number to output data using a memory cell management table 805, later described. The processing subsequent to this conversion is executed similarly to the first embodiment. The ROM-type memory cell chip 802 differs from the RAM-type memory cell chip 803 in that the former has a register 410 for storing response pattern data composed of a read only memory or ROM, while the latter is structured so as to be rewritable anytime from the main CPU 801.

Figure 9:
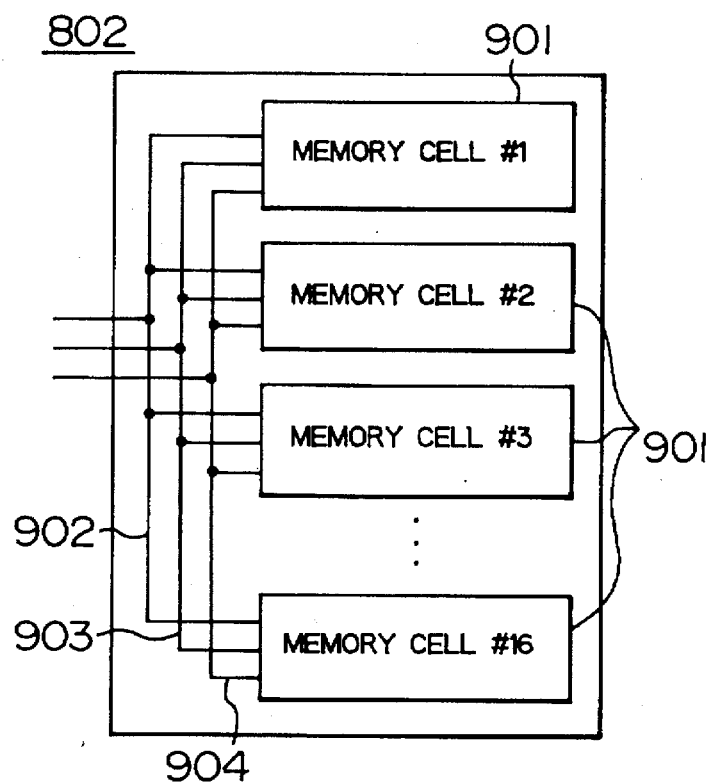
FIG. 9 shows the configuration of a ROM type memory cell chip.

FIG. 9 illustrates the internal configuration of the ROM-type memory cell chip 802.

Basically, the ROM-type memory cell chip 802 has every 16 memory cells 103 in FIG. 1 integrated in one chip. Each of the memory cells 901 contained in a chip is coupled to a data bus 902, a control signal line 903, and a clock signal line 904, all provided in the chip, while the respective signal lines are coupled to external corresponding signal lines, respectively.

Figures 10, 11:
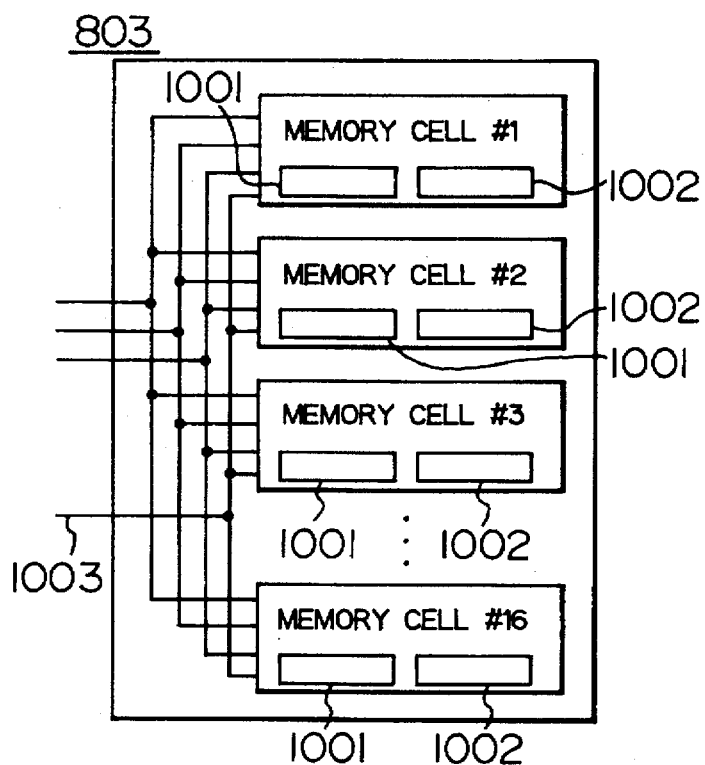
FIG. 10 shows the configuration of a RAM type memory cell chip.
FIG. 11 is a diagram showing the structure of a memory cell management table.

FIG. 10 illustrates the internal configuration of the RAM-type memory cell ship 803.

While the configuration presented by FIG. 10 is basically similar to that of the ROM-type memory cell chip 802 of FIG. 9, the former differs from the latter in that a register 1001 for storing response pattern data and a register 1002 for storing output data are composed of rewritable memories, and in that the former is provided with an address signal line 1003 for specifying an address in a memory cell to be written, when data to be stored is transferred from the main CPU 801.

In the configuration of FIG. 8, the operation is executed in the following two modes:

(1) Execution mode; and
(2) Learning mode.

When operating in the execution mode (1), the ROM-type memory cell chips 802 are treated equivalently to the RAM-type memory cell chips 803 so that these memory cell chips operate in a manner similar to that explained in connection with the first embodiment. The learning mode (2), which is peculiar to the present embodiment, will be explained below in detail. It is assumed here that, upon executing in the learning mode, the main CPU 801 is simultaneously supplied not only with input data but also with correct output data corresponding to the input data (which is called "teacher data").

Reference is first made to FIG. 11 which shows the structure of a memory cell management table used by the main CPU 801.

Each row of the table corresponds to a memory cell. A column 1101 indicates numbers given to memory cells contained in the RAM-type memory cell chips 803. It is assumed here that the memory cell numbers stored in the ROM-type memory cell chips 802 take values, greater than 1,000, while the memory cell numbers stored in the RAM-type memory cell chips 803 take values in a range from 1 to 1000.

A column 1102 contains a use flag indicating whether a memory cell corresponding to a memory cell number stored in the column 1101 is actually in use. A column 1103 contains a value of an exception flag indicating whether the content of a memory cell corresponding to a row falls under exceptional events. A column 1104 contains response pattern data of a corresponding memory cell, and a column 1105 output data. A memory cell number outputted from a memory cell to the main CPU 802 in operation is converted to output data in accordance with the contents of the column 1105. A column 1106 contains the number of times the associated memory cell has been referenced.

FIG. 12 shows a processing flow of the main CPU 801 in the learning mode. At step 1201, initialization is executed only when the learning mode is entered for the first time. This initialization process sequentially sets memory cell numbers stored in the RAM-type memory cell chips 803 shown in FIG. 8 into the column 1101 of the memory cell management table, and clears all the contents of the columns 1102, 1103 and 1106 to zero. Also, the contents of the response pattern register 1101 and the output data register 1102 stored in the RAM-type memory cells 803 of FIG. 8 are set to a value which would never appear as input data and output data, for example, −1 (FFFF in hexadecimal notation) in two-byte representation of integers. Likewise, values are set in the columns 1104 and 1105.

At step 1202, it is determined whether learning termination conditions are satisfied, and processes at steps 1203–1205 are repeated as long as the learning termination conditions are not satisfied.

At step 1203, output data is determined by a method similar to that explained in connection with the first embodiment, using data inputted when the learning mode operation is started as well as the ROM-type memory cell chips 802 and the RAM-type memory cell chips 803.

At step 1204, the contents of the column 1106 are incremented by one for a memory cell referenced at step 1203.

At step 1205, outputs calculated from outputs of memory cells, for example Rav and Tav in the case of the first embodiment, are compared with R'av and T'av given as teacher data, respectively. Then, the difference E (=|Rav−R'av|2+|Tav−T'av|2) is calculated, where **2 represents a square calculation. Next, the difference E is compared with a predetermined threshold value θ, and if the difference E is equal to or larger than the threshold value, processes at and after step 1206 are executed, while the process at step 1203 is again executed if smaller.

At step 1206, the column 1102 in the memory cell management table of FIG. 11 is examined to see whether a memory cell currently not in use exists. If one exists, the learning is executed due to addition of the memory cell at step 1207. Otherwise, if no unused memory cell exists, processes at and after step 1208, i.e., the learning due to update of the contents of memory cells, are executed.

At step 1207, the number of the unused memory cell found at step 1206 is set to a variable i.

The processes at steps 1208 and 1209 are executed when no empty memory cell is found at step 1206. First, at step 1208, determination is made of a number of a memory cell, the contents of which are to be rewritten, within the memory cells contained in the RAM-type memory cell chips. In this embodiment, a memory cell is selected which has the value of the exception flag in the column 1103 set to zero and the number of times referenced stored in the column 1106 indicating the smallest value in the memory cell management table of FIG. 11. Other than the foregoing, a variety of methods can be conceived for the selection of a memory cell to be rewritten, for example, a method which selects the memory cell that has not been referenced for the longest time period of all the memory cells.

At step 1209, the number of the memory cell, the contents of which are rewritten, as determined at step 1208, is set to the variable i.

At step 1210, the contents of the ith memory cell are replaced with those corresponding to current teacher data. In other words, the values of current input data are set to the response pattern register of the ith memory cell.

At step 1211, a search is made for a row which has the column 1101 set to the value equal to the variable i in the management table of FIG. 11, and the values of the current input data are set to the column 1104 indicative of response pattern data, while the values of the teacher data R'av and T'av are set to the column 1105 in that row.

At step 1212, the use flag, stored in the column 1102 of the row in the management table which has the contents of the columns 1104 and 1105 rewritten at step 1211, is set to one.

At step 1213, current inputs are examined to see whether they belong to exceptional events. For attending to an exceptional input, the contents of the column 1103 are set to one at step 1214. The "exceptional events" refer to those events which do not occur when the control is normally performed but may possibly occur when the control is deviated from a normal state by some cause, e.g., knocking, engine failure and so on in examples of engine control. In the learning mode, when these exceptional events have rarely occurred for a long time, the learning function can delete input/output relations relative to those exceptional events. To avoid such inconvenience, the present embodiment provides in the memory cell management table a flag indicating whether a current input is an exceptional event, so that input/output relations relative to such exceptional events are protected from being lost by the learning function. A variety of means may be used to determine whether an input is classified as an exceptional event. In this embodiment, how to provide input and output data for the learning function is assumed to be wholly managed by an external control, so that information serving as bases to determine the exceptional events is also provided from the outside.

The foregoing processing is executed once or a plurality of times for input data and the teacher data, whereby the contents of the RAM-type memory cell chips can be organized by the learning.

As described above, the second embodiment of the present invention realizes the learning function as addition and replacement of memory cells. Alternatively, the learning may be realized by sequential modifications of the contents of memory cells. In this case, the following processing may be executed corresponding to the processes at and after step 1210 in FIG. 12.

The thinking of this processing lies in that the contents of, for example, three memory cells used to calculate the outputs Rav, Tav (that is, the contents of either or both of response pattern data and output data) are modified such that the output difference E (=|Rav−R'av|2+|Tav−T'av|2) becomes smaller. If a so-called method of steepest descent, which modifies both of the response pattern data and the input data in a direction in which the difference E most largely changes, is employed by way of example, the following procedure may be taken.

First, for output data Ri (i=1,2,3), the following equation is satisfied:

$$\partial E/\partial Ri = 2(Rav - R'av) \cdot \partial Rav/\partial Ri$$
$$= (1/Di)/\Sigma(1/Dj)$$

where $\Sigma$ represents a sum of 1/Dj with j=1, 2, 3, so that modification of Ri may be performed in accordance with the following equations:

$$Ri \leftarrow Ri + \Delta Ri, \ \Delta Ri = -\eta \cdot \partial E/\partial Ri$$

where $\eta$ represents a constant called a learning coefficient for controlling a modification speed for Ri and is normally set to a fixed value approximately ranging from 0.01 to 0.2. Ti can also be modified exactly in the same way.

Next, response pattern data (a'i, v'i, r'i, t'i, p'i) are modified in the following manner. Assuming that either of the five response pattern data items is represented by x'i, the output difference E depends on x'i only through the distance Di between response pattern data and input data, so that the following equations are satisfied:

$$\partial E/\partial x'i = \partial E/\partial Rav \cdot \partial Rav/\partial x'i + \partial E/\partial Tav \cdot \partial Tav/\partial x'i$$

$$\partial Rav/\partial x'i = \partial Rav/\partial(1/Di) \cdot (-1/Di**2) \cdot \partial Di/\partial x'i$$

These equations are applicable to Tav in exactly the same way. Further, from the following equation:

$$\partial E/\partial(1/Di) = 2(Rav - R'av) \cdot [Ri/\Sigma(1/Dj) - \Sigma Rj/Dj/(\Sigma(1/Dj)**2]$$

$\partial E/\partial x'i$ can be derived when these equations are combined. Thus, the modification by the method of steepest descent can be performed by modifying each response pattern data with the following equation:

$$x'i \leftarrow x'i + \Delta x'i, \ \Delta x'i = -\eta \cdot \partial E/\partial x'i$$

According to the second embodiment as described above, rewritable RAM-type memory cells are used to allow response pattern data and output data stored in the RAM-type memory cells to be added, replaced and modified so as to reduce the difference between teacher data and output data, thus making it possible to realize a learning-type controller which gradually improves the control accuracy.

Also, since a certain number (16 in the second embodiment) of memory cells are integrated in a single chip, addition of memory cells is largely facilitated. Therefore, when the configuration of the present embodiment is employed, a wide range of systems from small scale to large scale can be realized by the same configuration, thereby providing a system which can flexibly attend to an increase in the number of memory cells due to design changes.

While the second embodiment described above is configured to make the contents of response pattern data and output data rewritable, another configuration may also be employed, wherein the distance calculation in FIG. 6 is executed by a general purpose microprocessor and a program instead of dedicated hardware, and a RAM constituting a program memory containing the program and the lookup table 623 shown in FIG. 6, so that the program and lookup table in the RAM are made rewritable by instructions of the main CPU. With such a configuration, the priority of outputs can be flexibly set for each memory cell from the main CPU, thereby making it possible to realize a more accurate controller.

This learning-type controller can of course be incorporated in an engine control system as described in connection with the first embodiment, as well as more general home-use electric apparatuses such as an air conditioner, refrigerator, washing machine and so on, as a built-in controller. In this case, a user may provide correct values serving as teacher data to such a controller incorporated system so that the system gradually modifies its control so as to comply with usage and user preference.

While the foregoing first and second embodiments of the present invention have been explained in connection with controllers, other information processing apparatuses for pattern recognition and so on may be regarded as being basically similar to the controller with respect to how to represent complicated input/output relations, so that the above described method of using sets of response pattern data—output data stored in memory cells may be applied to such information processing apparatuses in the same way.

Next, a third embodiment of the present invention will be explained with reference to FIGS. 13–16.

FIG. 13 illustrates the configuration of an ordinary knowledge processing system. An inference engine 1301, which is the core of a knowledge processing system, receives inputs from a database 1303, an on-line cable 1304, a work station 1305, and so on through an input/output interface 1302. The inference engine 1301 sequentially applies rules in an if-then form stored in a knowledge base 1306 to each inputted data (a value or symbol) to derive an output. The mechanism of this inference is described in detail in many common literature references. The output of the inference engine 1301 is written into the database 1303, transmitted through the on-line cable 1304, displayed on the screen of the work station 1305, and used for other purposes through the input/output interface 1302. This processing is repeated each time new data is inputted.

A specific example of a system utilizing knowledge processing is described in detail, for example, in a publication entitled "Decision Support Expert System for Financial Transactions" by Hidekazu Shigemi et al, pp. 51–56 in Hitachi Review, Vol 72, No. 11 (November, 1990).

FIG. 14 illustrates the configuration of the third embodiment of the present invention.

An inference engine 1410, an input/output interface 1402, a database 1403, an on-line cable 1404, a work station 1405, and a knowledge base 1406 are configured in the same way as those of FIG. 13. The present embodiment is characterized by an association process unit 1407 disposed between the input/output interface 1402 and the inference engine 1401 for storing a great number of input data/output data sets which have been used in past inferences. The association process unit 1407 comprises an associative engine 1408 which is configured in a manner similar to the engine control unit explained in the first embodiment and the learning-type controller explained in the second embodiment of the present invention. It should be noted that the associative engine 1408 has memory cells which are all composed of externally rewritable registers for response pattern data and output data, as the RAM-type memory cell chips shown in FIG. 10 of the second embodiment.

Figure 15:
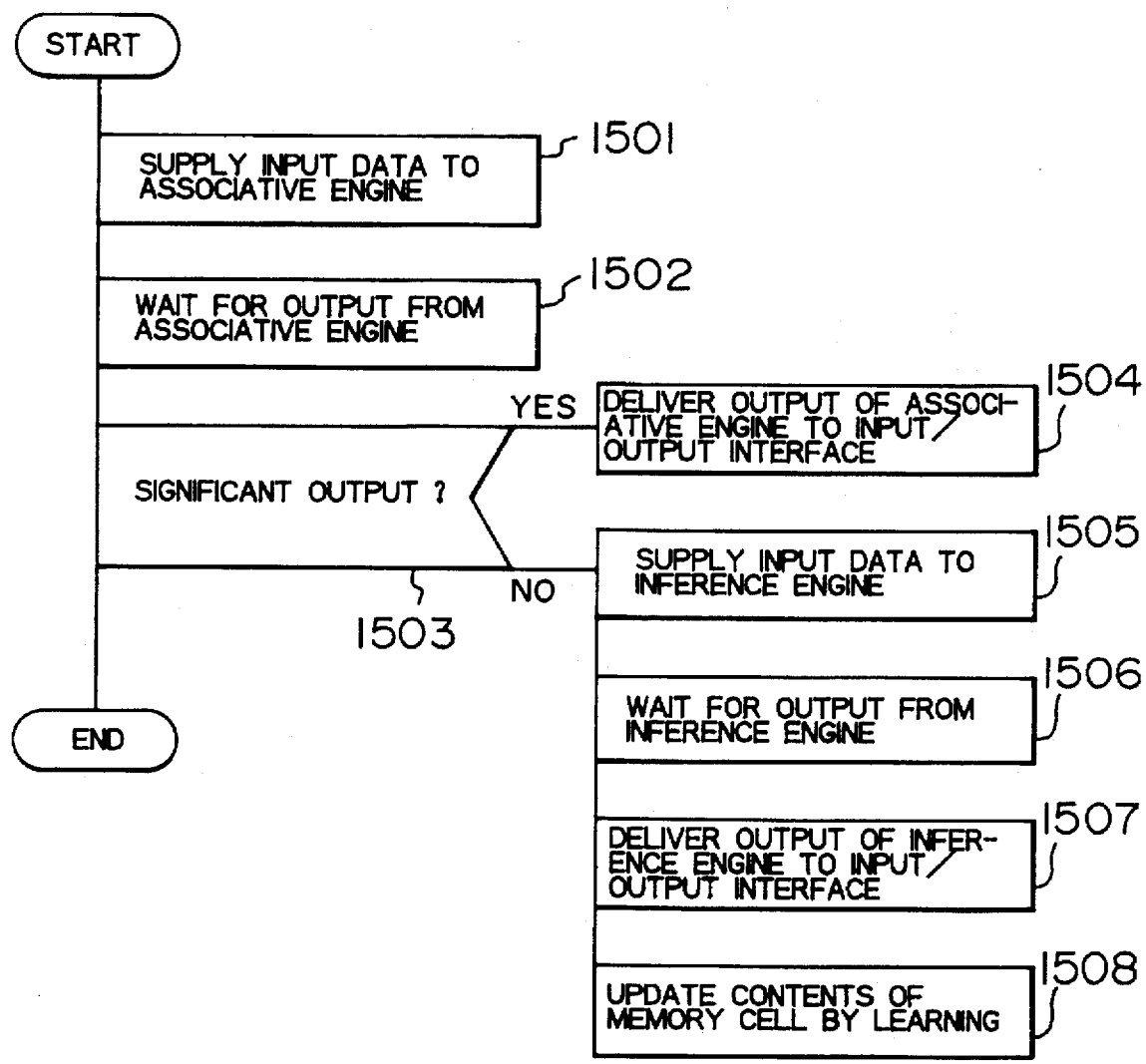
FIG. 15 is a processing flowchart showing the processing executed in an association process unit.

FIG. 15 illustrates a process flow showing the operations of the association process unit 1407.

First, at step 1501, data inputted to the input data association process unit 1407 is supplied to the associative engine 1408. The associative engine 1408 is configured, similarly to the correspondent shown in FIG. 1 or FIG. 4, such that input data is stored together with output data corresponding thereto in a pair form into each memory cell, and when actually inputted data coincides with input data (response pattern data) stored in one of the memory cells, the corresponding output data is delivered from the associative engine 1408. It is assumed in the present embodiment that symbolic input data is also permitted.

FIG. 16 shows an example of a rule used in a decision support system (technical analysis support system) presented in the aforementioned literature. As shown in FIG. 16, an ordinary inference engine mainly receives pattern names such as "Bull Order" in the example of FIG. 16, i.e., symbolic inputs.

In the present embodiment, assume that respective symbolic names have been previously assigned unique numbers (which may be considered as bit patterns). In this way, symbolic data as well as numerical data can be treated in a manner similar to the first or second embodiment. It should be noted however that the distance for symbolic data is determined depending on only whether the symbols are equal or different. Therefore, the numbers have previously been subjected to an appropriate scale conversion of numerical data such that, for example, in two-byte representation of integers, a range expressed by $\geq 0$ in 2's complement representation corresponds to numerical data, while a range expressed by $<0$ corresponds to symbolic data. Then, if the following distance calculation logic is determined for the symbolic data (for example, represented by s):

$$D=d \text{ if } s=s'=0 \text{ else}$$

numerical data can be mixed with symbolic data. In the above logic, s represents input data, s' the value of corresponding response pattern data, and d ($>0$) a proper constant. Symbolic data may include items which are meaningless unless they coincide. In this case, d in the above equation may be set to a very large value such that the output of that memory cell will not be actually selected unless the symbolic data coincides.

Turning back to FIG. 15, subsequent to step 1501, an output from the associative engine 1408 is awaited at step 1502. When an output is derived from the associative engine 1408, it is determined at step 1503 whether the output is valid. When valid output data is actually delivered from the associative engine 1408, that is, when a set of response pattern data—output data matching with the input data exists in the memory cells inside the associative engine 1408, a process at step 1504 is executed, and otherwise processes at and after step 1505 are executed.

At step 1504, the output from the associative engine 1408 derived at step 1502 is delivered to the input/output interface 1402 as an output of the association process unit 1407.

At step 1505, since no valid output data was derived from the associative engine 1408, the input data is supplied to the inference engine 1401. The inference engine 1401 calculates output data based on the processing described in the aforementioned literature and so on, using knowledge stored in the knowledge base 1406.

Next, at step 1506, an output from the inference engine 1401 is received by the association process unit 1407.

At step 1507, the output data received at step 1506 is delivered from the association process unit 1407 to the input/output interface 1402. At step 1508, the current input data is stored as response pattern data together with the output data into an empty cell in the associative engine 1408. However, if the associative engine 1408 does not have an empty memory cell, the contents of the less frequently referenced memory cell or the memory cell which has not been referenced for the longest time are replaced with the current input data, as described in connection with the second embodiment.

According to the third embodiment of the present invention as described above, in a system comprising complicated knowledge processing functions, frequently appearing input data is stored together with output data corresponding thereto in the association process unit 1407 for later utilization, so that a complicated knowledge processing need not be executed every time the same input data repeatedly appears, and the results can be derived at gradually increased speeds as the system is operating.

In the explanation given of the third embodiment, current input data was stored at step 1507 as is in an empty memory cell as response pattern data. As the number of items in the input data is increased, and as the number of rules stored in the knowledge base 1406 is increased, the processing executed inside the inference engine 1401 becomes more complicated. However, if the processing inside the inference engine 1401 is being monitored, it is possible to determine on which item of input data the resultant output of the inference engine 1401 depends. An example of this processing will be shown below.

As described also in the aforementioned "Introduction to Techniques for Building Expert Systems", a forward reasoning using rules executes a rule which is regarded to be applicable based on an event currently given as a fact, adds the "then-part (conclusion part)" of the rule as a new rule, again executes the rule, and repeats these operations until a final conclusion is derived. In this event, sequential recording is performed according to which rule has been executed in what order in the inference engine 1401. In this way, when a final conclusion is derived, the record can be traced in the reverse direction. Specifically, if an input data item exists in the "if-part (condition part)" of a rule finally used to derive a conclusion, this input data item is marked. If an intermediate data item generated by another rule also exists, a rule having that data item in its conclusion part can be located by reversely tracing the record. Similarly, the condition part of that rule is also examined. By repeating this trace, minimally required input data items can be determined for deriving a final conclusion.

When items of input data on which the output depends have been determined, these input data items necessary to the determination are described in a response pattern data column of a memory cell in the associative engine 1408. Other unnecessary input data items may also be stored in the memory cell as unnecessary data items by a treatment similar to that of the don't care value in the first embodiment. In this manner, since minimally required data items only can be reserved as response pattern data for deriving output data, the possibility of one memory cell matching with input data is increased, whereby similar effects can be produced with a smaller number of memory cells.

In the first—third embodiments described above, all the operations performed by hardware can be simulatively executed by software on a general-purpose computer. Even in this simulation, the following effects can be observed: the control accuracy is improved by the learning; the operation of the knowledge processing system becomes faster as the system is being used; and so on.

Figure 17:
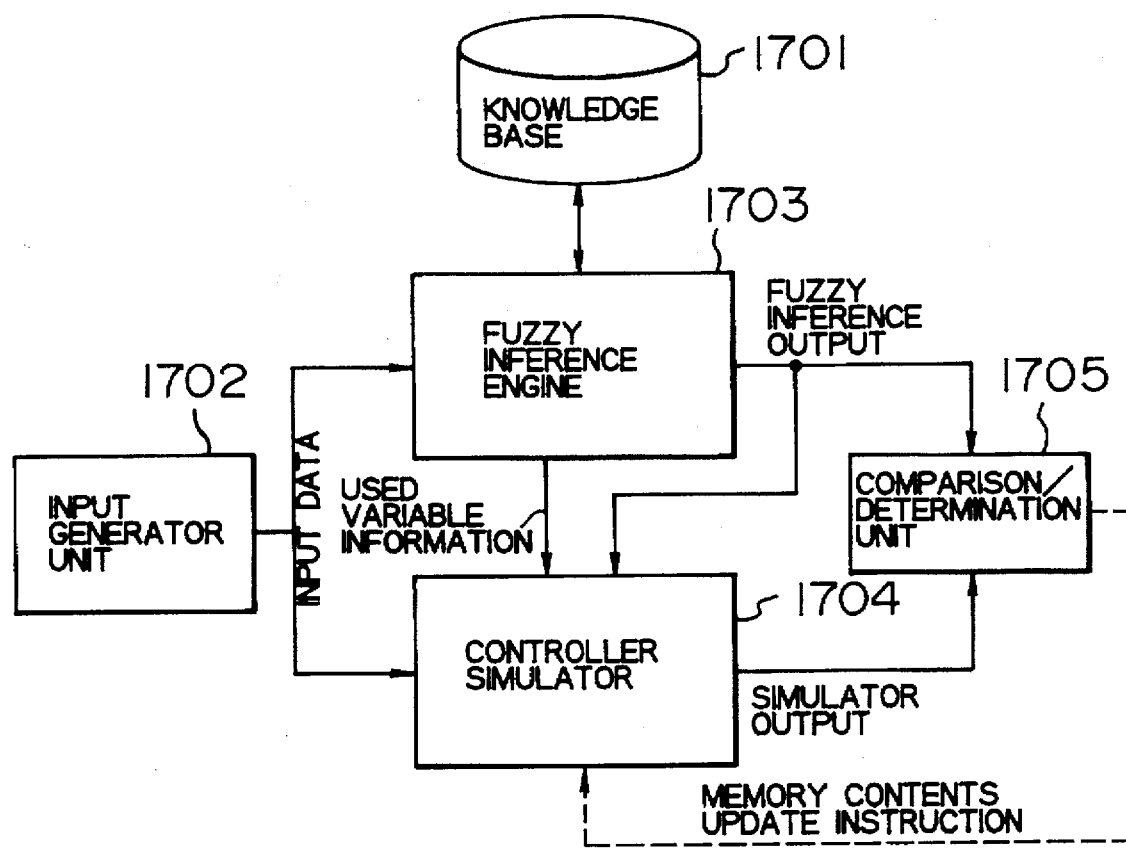
FIG. 17 is a block diagram showing the configuration of a controller designing system according to a fourth embodiment of the present invention.

FIG. 17 illustrates in block form the configuration of a controller designing system according to a fourth embodiment of the present invention. The system of this embodiment is intended to convert input/output relations previously represented by another means such as fuzzy knowledge to sets of response pattern data—output data in the first—third embodiments. Particularly, a system using fuzzy knowledge will be explained in detail in this embodiment.

Control knowledge empirically or partially known has previously been represented as fuzzy knowledge and stored in a fuzzy knowledge base 1701. An input generator means 1702 generates inputs to a fuzzy inference engine 1703 and a controller simulator 1704. The generator means 1702 may implement a method of completely randomly generating input values, a method of generating input values based on simulation or actually measured values of a control object, and so on. With any method employed, the operation of this system is identical.

The fuzzy inference engine 1703 calculates an output for an input value using the contents of the fuzzy knowledge base 1701.

Similarly, the controller simulator 1704 employs software to fully simulate the operations described in detail in the first—third embodiment, that is, all operations of a controller for storing sets of response pattern data—output data into memory cells and representing input/output relations, in order to calculate an output from input data. The contents of (simulated) memory cells inside the controller simulator 1704 are assumed to have previously been initialized prior to the designing of a controller. Specifically, using a memory cell management table similar to that of the second embodiment, use flags in all the memory cells are reset to place the memory cells in an unused state. In an initial input operation, since no response pattern data has been stored in any memory cell, no output value can be determined, in which case a default value is outputted which is previously determined by the controller simulator, for example, a special value such as "−1" (FFFF in hexadecimal representation) in two bytes representation of integers.

Outputs of the fuzzy inference engine 1703 and the controller simulator 1704 are supplied to a comparison/determination unit 1705. The comparison/determination unit 1705 calculates the difference between two sets of outputs and examines whether the difference exceeds a control tolerance which has previously been given as a design condition of a controller to be designed. When the controller simulator 1704 outputs the previously determined default value, the unit 1705 is made to always determine that the difference exceeds the control tolerance.

If the comparison/determination unit 1705 determines that the control tolerance is not exceeded, the contents of the memory cells inside the controller simulator 1704 are not updated. Then, a new input is generated by the input generator means 1702.

When a determination is made that the control tolerance is exceeded, a memory contents update instruction is issued to the controller simulator 1704, and the following operations are executed.

First, in the fuzzy inference engine 1703, examination is made as to which input variable was used to determine an output. When input values are designated, for example, x1–x10, a change in an output value is examined when x1 is changed by a minute amount as expressed by x1+Δx1 (for example, when an input value is represented by eight bits, the minute amount refers to the value represented by the least significant bit). If the output value changes, x1 is regarded to be used in the determination of the output value. This operation is sequentially repeated until x10 is examined.

Next, the controller simulator 1704 designates, from among values supplied from the input generator means 1702, those which have values of variables used to determine the output in the fuzzy inference engine 1703 and unused variables represented by the don't care value as response pattern data, and the output of the fuzzy inference engine 1703 as output data. These response pattern data and output data are combined to form a set which in turn is stored as the contents of a memory cell in the controller simulator 1704. The use flag of the memory cell in which the set has been stored is set to a value indicative of a used state in the memory cell management table, in a manner similar to the second embodiment.

The above operations are repeated until a predetermined condition is satisfied. This condition is assumed to be, for example, a condition that input values are generated by the input generator means 1702 a predetermined times (for example 1,000,000 times) or a condition that all the memory cells in the controller simulator 1704 are being used.

With the foregoing configuration, previously given input/output relations based on fuzzy knowledge are replaced by operations of the memory cells inside the controller simulator 1704.

Of course, the contents of memory cells generated by the above configuration may be further modified in on-line/off-line manner, using the learning mechanism as explained in the second embodiment, to improve the control accuracy. Also, the previously given knowledge is not limited to the fuzzy knowledge. Alternatively, even if the knowledge is given as a so-called rule-based knowledge, descriptions by equations or a combination of both, the operations and effects of the present embodiment will not be affected.

According to the fourth embodiment of the present invention as described above, since knowledge previously given as empirical/partial knowledge can be replaced by operations of a controller using memory cells, the contents of the memory cells can be easily determined, and initial values in modification of the contents of the memory cells by the learning can be efficiently determined with high accuracy.

Thus, according to the present invention, since a plurality of sets of an input and an output corresponding thereto have been prepared as sets of response pattern data—output data, and an output is determined on the basis of the sets, a complicated algorithm need not be designed on the basis of knowledge processing or mathematical control theories, making it possible to easily configure controllers, pattern recognition apparatuses, and so on.

The present invention is also advantageous in that the response pattern data can be composed of partial information of input data, so that input/output relations can be accurately represented with a smaller number of input/output sets.

The present invention is further advantageous in that the learning function is used to sequentially modify response pattern data or output data, or both of them, whereby the control or recognition accuracy can be gradually improved.

We claim:

1. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means;

output means for outputting said new output data calculated by said calculating means as output data of said information processing apparatus; and means for controlling said plurality of comparing-and-evaluating means to operate simultaneously in parallel.

2. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data therebetween for each data set;

calculating means for calculating new output data using results of said comparing and evaluating, performed by said comparing-and-evaluating means for each of said at least one data set, and using the output data in each of said at least one data set stored in said plurality of storage means; and output means for outputting said new output data calculated by said calculating means as output data of said information processing apparatus;

wherein said comparing-and-evaluating means are different from each other depending on said storage means with which each comparing-and-evaluating means has said one-to-one operative correspondence.

3. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means; and output means for outputting said new output data calculated by said calculating means as output data of said information processing apparatus;

wherein said calculating means includes means for selecting a plurality of data sets constituted by a respective pair of input data and output data in order of degree of similarity evaluated by said comparing-and-evaluating means, and means for obtaining the new output data based on output data of the plurality of data sets selected by said selecting means.

4. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means; and output means for outputting said new output data calculated by said calculating means as output data of said information processing apparatus;

wherein said comparing-and-evaluating means includes means for obtaining said degree of similarity by calculating the distance between new input data supplied to said information processing apparatus and stored input data stored in said storage means.

5. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means; and output means for outputting said new output data calculated by said calculating means as output data of said information processing apparatus;

wherein said calculating means includes means for deriving stored output data stored in one of said storage means by an averaging processing using said degree of similarity as a weighting coefficient.

6. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means; and output means for outputting said new output data calculated by said calculating means as output data of said information processing apparatus;

wherein said plurality of storage means are independent of each other;

wherein said plurality of storage means and said calculating means are connected to a common data bus;

wherein said plurality of storage means and said calculating means transfer said stored input data and said stored output data therebetween through said common data bus; and wherein said comparing-and-evaluating means includes means for outputting the degrees of similarity evaluated by the comparison of the new input data with the stored input data to said calculating means.

7. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means;

output means for outputting said new output data calculated by said calculating means as output data of said information processing apparatus;

means for storing a number for identifying the stored input data instead of said stored output data together with the stored input data as a data set;

means for calculating output data corresponding to the stored input data of a data set from the identification number stored in said data set; and means for calculating new output data using the calculated output data and results of said comparing and evaluating by said comparing-and-evaluating means for each data set;

wherein said means for calculating output data corresponding to the stored input data of the data set from the identification number includes means for storing information representing a correspondence of said identification number to said calculated output data.

8. An information processing apparatus for calculating output data having at least one element from input data having a plurality of elements, comprising:

a plurality of storage means for storing at least one data set, each data set being constituted by a pair of input data and output data;

means for receiving new input data and supplying said new input data to said plurality of storage means;

a plurality of comparing-and-evaluating means, in one-to-one operative correspondence with said plurality of storage means, for comparing said supplied new input data with the stored input data in each of said at least one data set stored in said plurality of storage means, and for evaluating a degree of similarity between the supplied new input data and the stored input data for each data set;

calculating means for calculating new output data using results of said comparing and evaluating, performed by said comparing-and-evaluating means for each of said at least one data set, and using the output data in each of said at least one data set stored in said plurality of storage means;

output means for outputting said new output data calculated by said calculating means as output data of said information processing apparatus; and means for inputting stored input data and correct output data for the stored input data, and for modifying the stored contents of the stored input data and stored output data stored in said storage means based on the difference between the new output data derived corresponding to the stored input data and the inputted correct output data;

wherein said each storage means is composed of both a rewritable memory and an unrewritable read only memory; and wherein said means for modifying the stored contents includes means for modifying the contents stored in the rewritable memory.

9. An information processing apparatus according to claim 8, wherein said means for modifying the stored contents includes means for correcting said stored input data and output data so as to reduce the difference between said new output data and said inputted correct output data.

10. An information processing apparatus according to claim 8, wherein said means for modifying the stored contents includes means for additionally storing a data set of input data and output data.

11. An information processing apparatus according to claim 8, wherein said means for modifying the stored contents replaces an unnecessary data set of input data and output data with a new data set.

12. An information processing apparatus according to claim 8, wherein said each storage means includes means for outputting at least one of output data and a degree of similarity respectively at different timings.

13. An information processing apparatus according to claim 12, wherein said each storage means includes means for determining an output timing for said each storage means based on said degree of similarity.

14. An information processing apparatus according to claim 12, wherein said each storage means includes:

means for calculating a waiting time of said each storage means based on said degree of similarity; and means for outputting at least one of the output data and the degree of similarity after the lapse of the waiting time calculated by said calculating means.

15. An information processing apparatus according to claim 12, wherein said calculating means includes means for determining total output data using data outputted from said storage means.

16. An information processing apparatus according to claim 12, wherein said calculating means includes means for selecting a predetermined number of earlier outputted data within data outputted from said storage means and for determining the total output data from the selected predetermined number of earlier data.

17. An information processing apparatus for delivering output data having at least one element from input data having a plurality of elements, comprising:

a knowledge base for storing knowledge for deriving output data from input data;

an inference engine for actuating said knowledge stored in said knowledge base on the input data and simultaneously performing an inference;

an associative engine for storing a plurality of data sets each constituted by a pair of said input data and output data, and for generating new output data associated with new input data supplied to said information processing apparatus on the basis of said stored plurality of data sets;

means for comparing an output of said inference engine with an output of said associative engine;

means for modifying said input data and said output data of a data set stored in said associative engine on the basis of said comparison result, said modifying means including means for newly storing a set of new input data supplied to said information processing apparatus and output data from said inference engine;

means for finding input data elements necessary to derive output data of said inference engine; and means for newly storing a set of values of the input data elements found by said finding means and the output data.

18. An information processing apparatus according to claim 17, further comprising, when output data from said associative engine are utilized, means for using said output data of said associative engine as said new output data of said information processing apparatus.

19. An information processing apparatus according to claim 17, further comprising, when output data from said associative engine cannot be utilized, means for supplying said new input data to said inference engine and for using an output from said inference engine as said new output data of said information processing apparatus.

* * * * *